US 7,155,070 B2

(12) United States Patent
Steinberg

(10) Patent No.: US 7,155,070 B2
(45) Date of Patent: Dec. 26, 2006

(54) VISUAL CELL PHONE NOTIFICATION OF PROCESSED FILM IMAGES

(75) Inventor: Eran Steinberg, San Francisco, CA (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 657 days.

(21) Appl. No.: 09/823,920

(22) Filed: Mar. 29, 2001

(65) Prior Publication Data

US 2002/0141661 A1  Oct. 3, 2002

(51) Int. Cl.
G06K 9/22 (2006.01)
(52) U.S. Cl. ............ 382/313; 235/462.45; 235/472.01; 382/311; 396/2; 455/412.2; 455/517; 705/27
(58) Field of Classification Search ................ 358/1.1, 358/1.15, 473; 382/232, 311, 313; 455/456.1–456.6, 455/461, 517, 550.1, 557, 566, 567, 412.1, 455/414.1, 415, 466, 412.2; 709/203, 204, 709/206, 219, 246; 345/1.1, 2.3; 348/14.12, 348/96; 396/2, 319, 420, 429, 564, 567, 396/578; 235/462.45, 472.01; 705/26, 27
See application file for complete search history.

(56) References Cited

U.S. PATENT DOCUMENTS

| | | | | |
|---|---|---|---|---|
| 5,806,005 A * | 9/1998 | Hull et al. | ................... | 455/566 |
| 5,893,037 A | 4/1999 | Reele et al. | ................ | 455/556 |
| 5,944,786 A | 8/1999 | Quinn | ........................ | 709/206 |
| 5,970,418 A | 10/1999 | Budd et al. | ................. | 455/550 |
| 6,006,087 A | 12/1999 | Amin | ......................... | 455/413 |
| 6,014,559 A | 1/2000 | Amin | ......................... | 455/413 |
| 6,061,718 A | 5/2000 | Nelson | ....................... | 709/206 |
| 6,320,668 B1 * | 11/2001 | Kim | ............................ | 358/1.1 |
| 6,417,913 B1 * | 7/2002 | Tanaka | ....................... | 355/39 |
| 6,441,927 B1 * | 8/2002 | Dow et al. | ................... | 358/473 |
| 6,442,625 B1 * | 8/2002 | Robinson et al. | .............. | 710/8 |
| 6,480,673 B1 * | 11/2002 | Liebenow | ....................... | 396/2 |
| 6,489,934 B1 * | 12/2002 | Klausner | ..................... | 345/1.1 |
| 6,512,570 B1 * | 1/2003 | Garfinkle et al. | ............. | 355/40 |
| 6,522,418 B1 * | 2/2003 | Yokomizo et al. | ......... | 358/1.15 |
| 6,539,400 B1 * | 3/2003 | Bloomfield et al. | ..... | 707/104.1 |
| 6,563,513 B1 * | 5/2003 | Yu et al. | ..................... | 345/698 |
| 6,567,619 B1 * | 5/2003 | Glogovsky | .................. | 396/429 |
| 6,570,583 B1 * | 5/2003 | Kung et al. | ................. | 345/661 |
| 6,571,246 B1 * | 5/2003 | Anderson et al. | ............. | 707/10 |
| 6,587,596 B1 * | 7/2003 | Haeberli | ...................... | 382/283 |
| 6,587,839 B1 * | 7/2003 | McIntyre et al. | ............. | 705/27 |
| 6,598,076 B1 * | 7/2003 | Chang et al. | ............... | 709/206 |
| 6,600,510 B1 * | 7/2003 | Parulski et al. | .......... | 348/211.2 |
| 6,628,899 B1 * | 9/2003 | Kito | ............................. | 396/56 |
| 6,631,011 B1 * | 10/2003 | Fredlund et al. | ........... | 358/1.15 |

(Continued)

Primary Examiner—Gregory Desire

(57) ABSTRACT

A method relating to film photography and digital delivery of images wherein a consumer can preview images of processed film sent from a film development laboratory to the consumer's cell phone equipped with a visual display. The consumer dropped the film at a service where the film is developed, and then scanned to create digital picture data. The picture data is then sent to the consumer's cell phone or similar device with wireless capability equipped for reception of digital image data, and in response to the data, the cell phone displays the pictures on the camera's image display. The consumer then views the pictures and can make decisions concerning how many prints of each image to order. The print order can then be placed with the service through the cell phone. Additional features include the consumer processing the digital image data including forwarding the images to another cell phone or to a computer.

31 Claims, 4 Drawing Sheets

U.S. PATENT DOCUMENTS

| | | | |
|---|---|---|---|
| 6,636,733 B1 * | 10/2003 | Helferich | 455/412.2 |
| 6,684,088 B1 * | 1/2004 | Halahmi | 455/566 |
| 6,690,955 B1 * | 2/2004 | Komiyama | 455/566 |
| 6,694,133 B1 * | 2/2004 | Tobita et al. | 455/414.1 |
| 6,697,529 B1 * | 2/2004 | Kuniba | 382/239 |
| 6,701,161 B1 * | 3/2004 | Wendling | 455/556.1 |
| 6,701,302 B1 * | 3/2004 | Schaeffer et al. | 705/26 |
| 6,701,845 B1 | 3/2004 | Ohmura | 101/484 |
| 6,731,952 B1 * | 5/2004 | Schaeffer et al. | 455/557 |
| 6,760,583 B1 * | 7/2004 | Ito et al. | 455/425 |
| 6,778,841 B1 * | 8/2004 | Bories et al. | 455/422.1 |
| 6,779,022 B1 * | 8/2004 | Horstmann et al. | 709/206 |
| 6,782,419 B1 * | 8/2004 | Tobita et al. | 709/219 |
| 6,784,899 B1 * | 8/2004 | Barrus et al. | 715/717 |
| 6,798,531 B1 * | 9/2004 | Paz-Pujalt et al. | 358/1.15 |
| 6,848,008 B1 * | 1/2005 | Sevanto et al. | 709/249 |
| 7,063,263 B1 * | 6/2006 | Swartz et al. | 235/472.02 |
| 2003/0036969 A1 * | 2/2003 | Turgeman et al. | 705/26 |

* cited by examiner

VISUAL CELL PHONE NOTIFICATION OF PROCESSED FILM IMAGES

BACKGROUND OF THE INVENTION

1. Field of the Invention

The present invention relates generally to photographic film processing, and more particularly to a method wherein a traditional analog film processing facility can send film images and notifications to a customer's visual display cell phone; and wherein the customer can preview and forward the images and place purchase orders with the processing facility through the cell phone or similar wireless communication device such as a hand held computer.

2. Description of the Prior Art

Traditional, film based camera technology provides excellent image detail and is well understood by the general public. Cameras with "instant" hard copy picture development do not provide the quality or flexibility of conventional film development at film processing centers, where the film can be developed and printed in a variety of ways. In order to obtain these benefits, the film must be sent to the processing center, where the film processing may take hours or days. At this point, prints can be examined and further processing can be requested as required. This time consuming series of events is a disadvantage of film based photography. The newer digital camera technology is rapidly becoming popular as digital cameras become more affordable, and as the general public becomes more familiar with digital equipment. As digital camera resolution, ease of use and price improve, a larger number of consumers will be drawn away from using film based cameras. As a result, the business of film processing and related equipment sales will suffer unless the film development houses adapt to the new digital offerings. Mobile cellular based phones are widely used, and have reached a critical mass in many countries. Mobile handsets are now used not only for making phone calls but also for other activities such as browsing the Internet, including viewing images on a display that is available with the phones. In addition, portable devices such as hand held PCs are offering similar wireless cellular connectivity.

In view of the above remarks, it is clear that there is a need to add convenience features to film technology in order to compete with the rapidly advancing digital camera business.

SUMMARY

It is therefore an object of the present invention to make the processing of film more convenient to the customer.

It is another object of the present invention to provide a method wherein a customer can preview images sent from a film processing service to the customer's display on a cell phone.

It is a further object of the present invention to provide a method wherein a film customer can quickly and easily review developed pictures, without the need to physically return to the location where the film was processed.

It is a further object of the present invention to provide a method wherein a film service facility scans a developed film and sends image data to a consumer's visual cell phone for previewing of the image by the consumer.

It is a still further object of the present invention to provide a method wherein a consumer can receive film images on a visual cell phone display and then forward the images to another cell phone with visual display and/or to a computer.

It is an object of the present invention to provide a method wherein a consumer can preview film images from a film service on a cell phone visual display and place an order for prints and enlargements based on the previewed images.

Briefly, a preferred embodiment of the present invention includes a method relating to film photography wherein a consumer can preview images of developed film sent from a film service facility to a consumers cell phone equipped with a visual display. The consumer delivers the film to the service where the film is developed, and then scanned to create digital picture data. The picture data is then sent to the consumer's cell phone equipped for reception of the digital image data, and in response to the data, the cell phone displays the pictures on the camera's image display. The consumer then views the pictures and can make decisions concerning how many prints of each image to order. The print order can then be placed with the service through the cell phone. Additional features include the consumer processing the digital image data, including forwarding the images to another cell phone or to a computer, and/or specifying a method of payment, and/or film and print delivery.

An advantage of the present invention is that it provides a more efficient method of getting film processed.

A further advantage of the present invention is that it allows a consumer the opportunity to view film images prior to ordering prints.

A still further advantage of the present invention is that it provides a consumer with a digital copy of a film based image, wherein the digital copy can be processed using digital techniques, including the facility for forwarding the images to another cell phone and/or a computer.

IN THE DRAWING

DETAILED DESCRIPTION OF THE PREFERRED EMBODIMENTS

Figure 1:
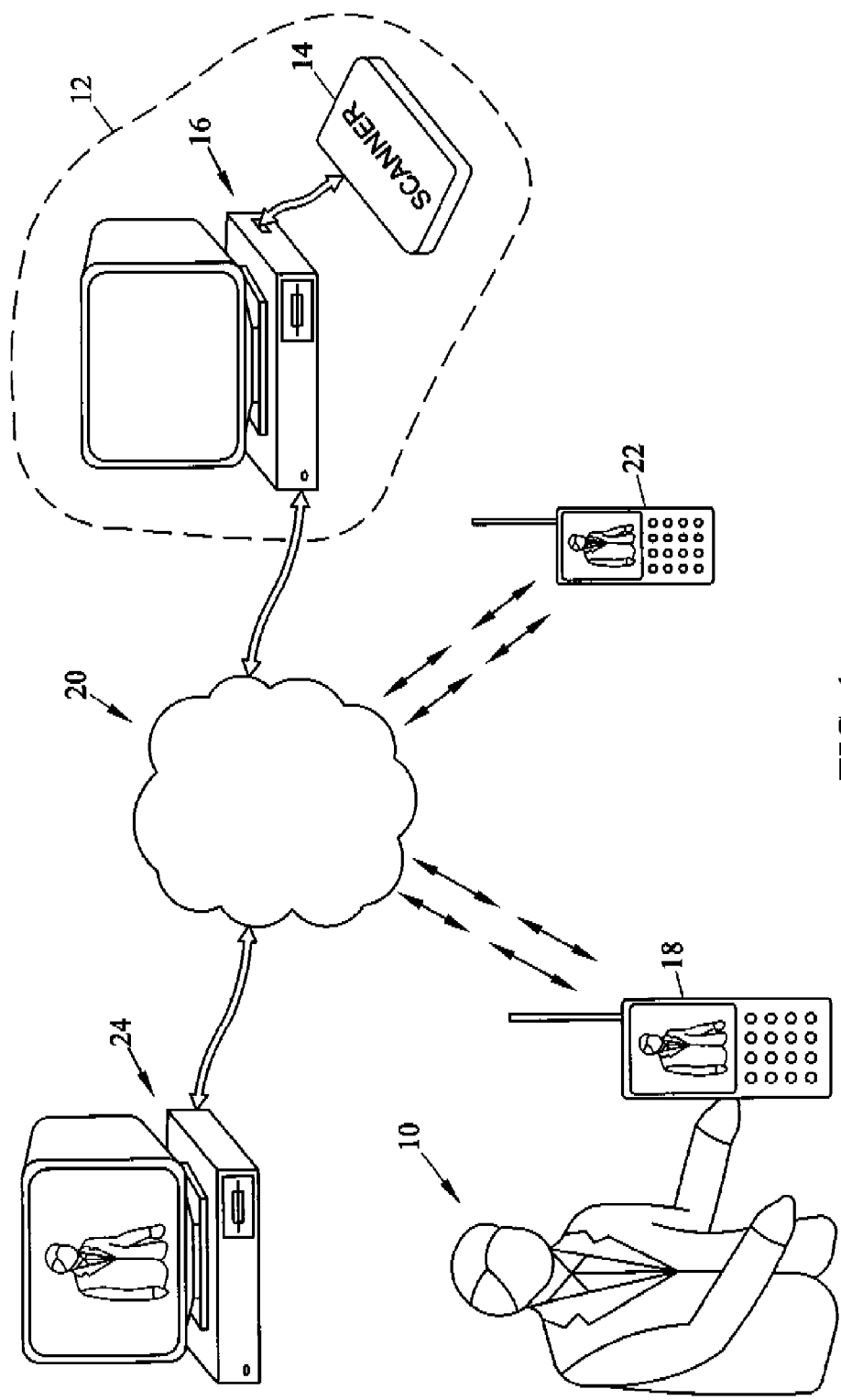
FIG. 1 illustrates hardware used in the method of the present invention.

Referring now to FIG. 1 of the drawing, the method of the present invention will be described in reference to the various hardware items displayed. The process or i.e. method begins with a consumer 10 delivering a film to a film processing service 12. The service 12 develops the film (not shown) and then proceeds to scan the film. This is symbolically represented in FIG. 1 by a scanner 14. The scanned digital data is stored on a computer 16. Generally, this scanning is done at a low resolution for providing relatively small, positive images for review/evaluation. These are called "thumbnails". Thumbnails are typically about 160×120 pixels in size for a 4×3 aspect ratio image. Due to the low resolution, an enlargement of these images would not have an acceptable quality, and therefore the "thumbnails" have little value and can be freely distributed prior to a sale.

A novelty of the present invention includes sending the scanned image data to the consumer's cell phone 18, typically through a phone network 20. The consumer 10 can then view the "thumbnails" and determine the sizes and quantities of prints desired. An order for prints can then be communicated to the service 12. The consumer can also send the "thumbnail" image data to another cell phone 22 or to a computer 24. Although the preferred embodiment includes use of a programmable cell phone equipped with a visual display, the method of the present invention also includes any wireless, computerized, handheld apparatus or otherwise portable apparatus with a visual display, to which a user can receive and send messages, etc. A typical alternative is a wireless portable/handheld computer.

Although the preferred method described above uses low resolution "thumbnail" data, the method also includes the service 12 scanning and sending high resolution data. This, for example, would preferably be done subsequent to prepayment to cover the value of the high resolution data.

Figure 2:
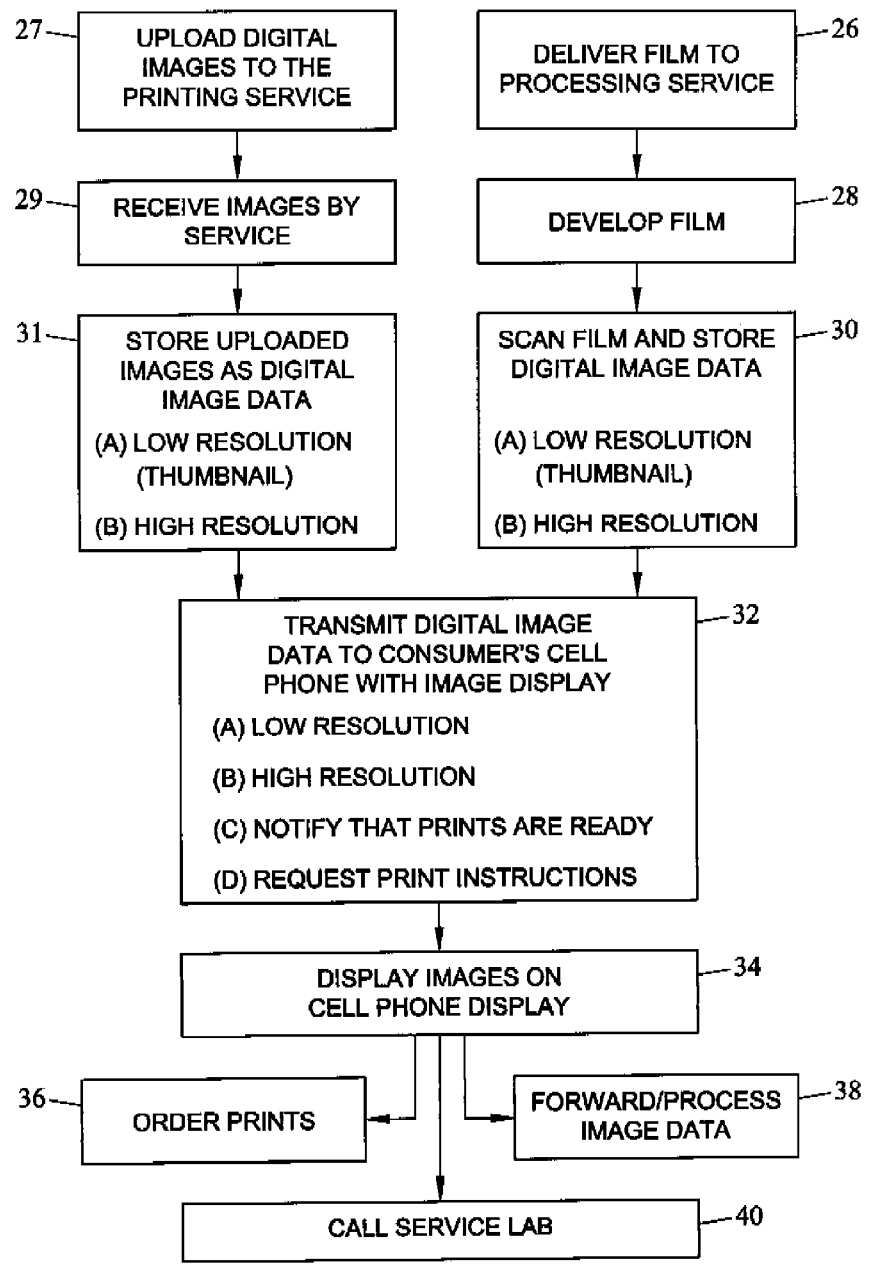
FIG. 2 is a flow chart of the method of the present invention.

FIG. 2 is a flow chart of the preferred method of the present invention. A consumer sends/delivers film to a processing service 12 (block 26). The service 12 develops the film (block 28), and then scans and stores the film as digital image data (block 30). The data can be either low or high resolution data or both. According to the preferred embodiment, the service 12 then transmits the thumbnail, low resolution data to the consumer cell phone equipped for viewing digital images (block 32), and may include a notice that prints are ready for pick-up. Alternatively, the service can refrain from printing, and require that the consumer provide a print order after viewing the thumbnail images. As a further embodiment, the service can transmit high resolution image data as described above. With the image data in the cell phone, the consumer can then activate the cell phone and display the images (block 34). The consumer can then decide what images are needed and what kind of prints are desired and order the prints (block 36). The consumer can also forward the thumbnail image data (block 38). As a further embodiment, a user can call the service facility lab by clicking on a displayed icon (block 40). This will be described in further detail in reference to FIGS. 3a–3c.

The above description of the present invention is particularly applicable as illustrated for conveying film processing information and results, and for conducting related business dealing with the processing of photographic film. FIG. 2 also illustrates the use of the visual cell phone for communication relating to photographic processes based on a digitally acquired image. In this embodiment of the invention, a person can upload digital image data (block 27) for reception by a photographic processing service (block 29). The processing service can then store the images as image data and subsequently perform various processes/procedures on the images. Low or high resolution thumbnails of the resulting images can be prepared (block 31) and transmitted for review by a customer (block 32). The description of the procedures of blocks 32–40 are the same when dealing with photographic services relating to the processing of digitally acquired images.

Figure 3C:
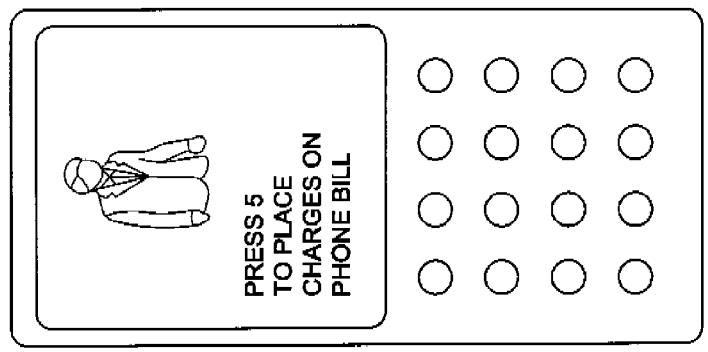
FIG. 3c illustrates a third of a sequence of messages and instructions on a cell phone display.
Figure 3B:
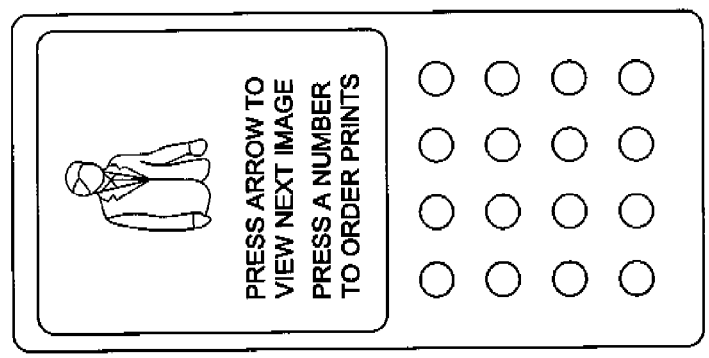
FIG. 3b illustrates a second of a sequence of messages and instructions on a cell phone display.
Figure 3A:
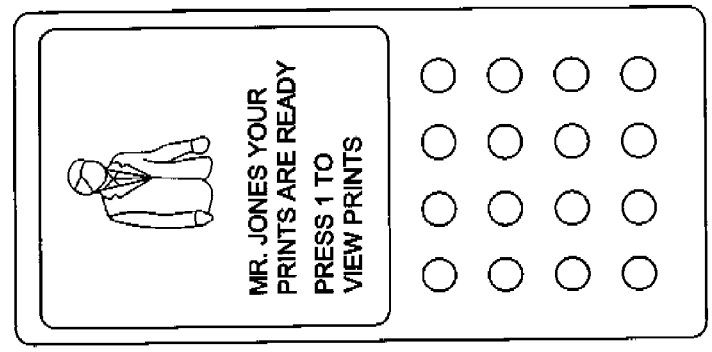
FIG. 3a illustrates a first of a sequence of messages and instructions on a cell phone display.

FIGS. 3a–3c illustrates a series of massages/instructions displayed on the cell phone FIG. 3a shows an initial message notifying the consumer that prints are ready, and giving instructions on viewing the thumbnails/images. FIG. 3b illustrates an instruction to view additional images, and an instruction on how to request prints. FIG. 3c illustrates an instruction regarding billing. These messages are examples, and represent the preferred embodiment. The present invention includes other messages and instructions.

In general, the above description includes the preferred embodiments. Various alternatives will be apparent to those skilled in the art upon reading the present disclosure and these are to be included in the spirit of the present invention. For example, according to the present invention, the cell phone can be replaced with any hand held device for receiving visual images, such as a Palm or Handspring PDA. Numerous billing options can be communicated on the cell phone display, such as including the processing bill with the customer's telephone bill, or paying the bill through a charge card/VISA, etc. The display may include delivery options, such as pick-up by the customer, or mailing the results to the customer's home, etc. A provision can also be included on the screen whereby the user/consumer can automatically make a phone connection to the process service lab. Such a phone connection may be automated, or can even be a live connection to speak to a person in the lab. In this case, when a special icon is provided to make the phone connection, clicking on the icon can first send an instruction to a service lab computer to put the consumer's account job data on the lab computer screen, so when the lab attendant picks up the phone he has reference to the job immediately. As another factor, if an APS film is used where the film has a unique identification, this identification can be included on the cell phone screen.

Figure 4:
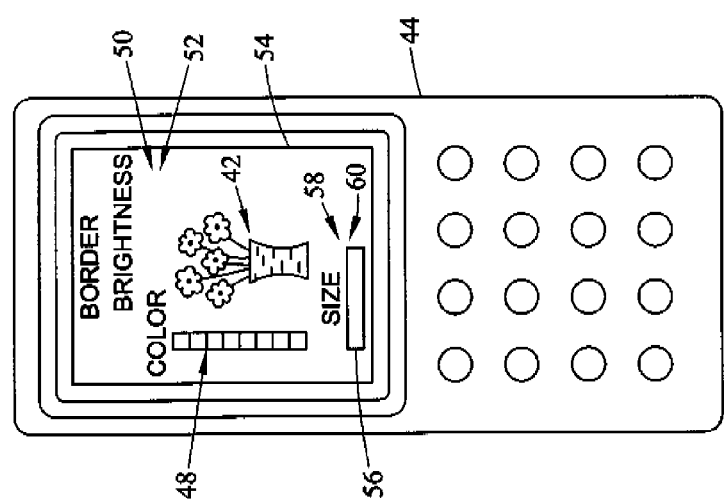
FIG. 4 illustrates various interactive displays allowing a user to enter information regarding film processing instructions to be sent to the processing lab upon placing a print order.

FIG. 4 illustrates a further interactive optional feature of the method of the present invention. When an image 42 is displayed on the cell phone 44 display 46, the user is presented with image 16 adjustment options. The image 42 as shown, represents the image in brightness and color as it would be printed if the user were to order prints. In film processing, some variations are possible, and these variations can be communicated to the processing lab. The user, for example can adjust the color characteristic by selecting a position on a color scale 48. Image brightness can be adjusted by clicking on the up or down arrows 50 and 52 respectively. The processing lab can also offer additional features to the user through interactive selection. For example, the customer can select to have a border 54 placed around the image 42 by clicking on "border". Once "border" is selected, the color of the border can be adjusted by selecting a position on the color scale 48. Clicking on "color" at this point can return the function of the color scale 48 to the image 42. The user can select an image size for printing by clicking on "size" box 56 select arrows 58, 60. The program in the cell phone 44 stores these various data, and when the user selects to order prints, the custom alternations as explained above are sent to the processing lab computer automatically over the phone network as instructions for processing along with the print order. These and other variations are included in the spirit of the present invention.

What is claimed is:

1. A method relating to photographic film processing comprising:

developing photographic film to produce a developed film;

scanning said developed film to create digital image data;

transmitting said digital image data through a network to a first portable device including wireless communication apparatus and a visual display screen for visual display of an image, and transmitting to said first portable device a message notifying a consumer that a print of the image can be ordered or the print is ready for pick-up;

presenting the consumer with image adjustment options that allow the user to perform one of adjusting an image color, and manipulating a color border for an image;

receiving an order for a print corresponding to an image viewed on said device visual display screen along with the image adjustments specified by the user and using the image adjustments to process the print order wherein said device is a cell phone.

2. A method as recited in claim 1 further comprising displaying a visual image of said digital image data on said visual display screen.

3. A method as recited in claim 1 further comprising forwarding said digital image data from a first user of said first cell phone to a second user of a second cell phone.

4. A method as recited in claim 1 wherein said digital image data that is sent to the cell phone is low resolution image data.

5. A method as recited in claim 1 wherein said digital image data is high resolution image data.

6. A method as recited in claim 5 wherein the user can zoom and view details of the said high resolution image on said visual display which may be of lower resolution than said high resolution image.

7. A method as recited in claim 1 further comprising forwarding said digital image data from said first cell phone to a network computer.

8. A method as recited in claim 1 further comprising digitally processing said digital image data subsequent to reception by said cell phone.

9. A method as recited in claim 8 wherein a computer may have programmed therein billing information of said customer.

10. A method as recited in claim 1 further comprising displaying an icon on said first cell phone display wherein the selection of said icon automatically causes said first cell phone to be communicatively connected with a service facility, wherein said service facility performs said developing and said scanning and said transmitting.

11. A method as recited in claim 10 wherein selection of said icon further causes an instruction to be sent to a computer at said service facility for requesting that a customers job data be placed on a computer monitor screen.

12. A method as recited in claim 1 further comprising placing an order for a print corresponding to an image received on said cell phone visual display screen.

13. A method as recited in claim 12 further comprising automatically adding a fee for said prints to a phone account of said cell phone user.

14. A method as recited in claim 1 further comprising placing an interactive display on said visual display screen allowing a user to interact with said display.

15. A method as recited in claim 14 wherein said interactive display provides said user with the ability to order prints of said images via said cellular phone.

16. A method of processing digital images comprising:
uploading first digital image data to a photographic service facility;
transmitting second digital image data derived from said first digital image data through a network to a first portable device capable of wireless communication and equipped with a visual display screen for visual display of an image, and transmitting to said first portable device a message notifying a consumer that a print of the second digital image data can be ordered or the print is ready for pick-up;

presenting the consumer with image adjustment options that allow the user to perform one of adjusting an image color, and manipulating a color border for said second digital image data;

receiving an order for a print corresponding to the second digital image data viewed on said device visual display screen along with the image adjustments specified by the user; and using the image adjustments to process the print order wherein said device is a cell phone.

17. A method as recited in claim 16 wherein said second image data is a copy of said first image data.

18. A method as recited in claim 16 further comprising displaying a visual image of said second digital image data on said visual display screen.

19. A method as recited in claim 18 further comprising placing an interactive display on said visual display screen allowing a user to interact with said display.

20. A method as recited in claim 19 wherein said interactive display provides said user with the ability to order prints of said images via said first device.

21. A method as recited in claim 16 further comprising forwarding said second digital image data from a first user of said first device to a second user of a second device.

22. A method as recited in claim 16 wherein said second digital image data that is sent to the first device is low resolution image data.

23. A method as recited in claim 16 wherein said second digital image data is high resolution image data.

24. A method as recited in claim 23 wherein the user can zoom and view details of a high resolution image corresponding to said high resolution image data on said visual display which may be of lower resolution than said high resolution image.

25. A method as recited in claim 16 further comprising forwarding said second digital image data from said first device to a network computer.

26. A method as recited in claim 16 further comprising digitally processing said second digital Image data subsequent to reception by said first device.

27. A method as recited in claim 16 further comprising displaying an icon on said first device display wherein the selection of said icon automatically causes said first device to be communicatively connected with a service facility, wherein said service facility performs said developing and said scanning and said transmitting.

28. A method as recited in claim 27 wherein selection of said icon further causes an instruction to be sent to a computer at said service facility for requesting that a customer's job data be placed on a computer monitor screen.

29. A method as recited in claim 27 wherein a computer is programmed to contain billing information of said customer.

30. A method as recited in claim 21 further comprising automatically adding a fee for said prints to a phone account of said cell phone user.

31. A method relating to photographic film processing comprising:
developing photographic film to produce a developed film;
scanning said developed film at a service facility to create digital image data;
transmitting said digital image data through a network from said service facility to a first cell phone including a display for visual display of an image, and transmitting to said first cell phone a message notifying a consumer that a print of the image can be ordered or the print is ready for pick-up; and displaying an icon on said first cell phone display, wherein the selection of said icon automatically causes said first cell phone to be communicatively connected with said service facility, such that an instruction is sent to a computer at said service facility for requesting that job data of the consumer be presented.

* * * * *